United States Patent [19]

Heyl

[11] 4,059,205
[45] Nov. 22, 1977

[54] ROTARY VALVE

[75] Inventor: Robert D. Heyl, Williamsport, Pa.

[73] Assignee: The Young Industries, Inc., Muncy, Pa.

[21] Appl. No.: 677,862

[22] Filed: Apr. 16, 1976

[51] Int. Cl.² ............................................. G01F 11/00
[52] U.S. Cl. ................................................. 222/368
[58] Field of Search .................. 222/368, 194, 310; 302/49; 277/38, 39

[56] References Cited

U.S. PATENT DOCUMENTS

| 46,821 | 3/1865 | Regan | 222/368 |
|---|---|---|---|
| 2,795,464 | 6/1957 | Richards et al. | 302/49 |
| 2,938,651 | 5/1960 | Specht et al. | 222/368 X |
| 3,219,208 | 11/1965 | Hadley et al. | 222/368 X |

FOREIGN PATENT DOCUMENTS 2,213,648 10/1973 Germany .............................. 302/49

Primary Examiner—Stanley H. Tollberg
Assistant Examiner—Hadd Lane
Attorney, Agent, or Firm—Mason, Fenwick & Lawrence

[57] ABSTRACT

A rotary valve which is particularly useful in handling foodstuff or materials which will not tolerate cross-batch contamination, said valve including a housing having an inlet and an outlet which may be connected to a pneumatic conveying duct or the like, and having an access open end, a detachable closure mounted on said housing for closing said opening and, a drive shaft journalled in said housing having a free end disposed between said inlet and outlet, adjacent said closure, a rotor mounted on the free end of said shaft having an annular surface engageable with said housing, said annular surface having at least one recess communicable with said inlet and outlet by rotating the drive shaft for conveying material from said inlet to said outlet, a first axial seal disposed between said housing and said rotor, and a second axial seal disposed between said rotor and said closure, in substantial longitudinal alignment with said first axial seal.

23 Claims, 4 Drawing Figures

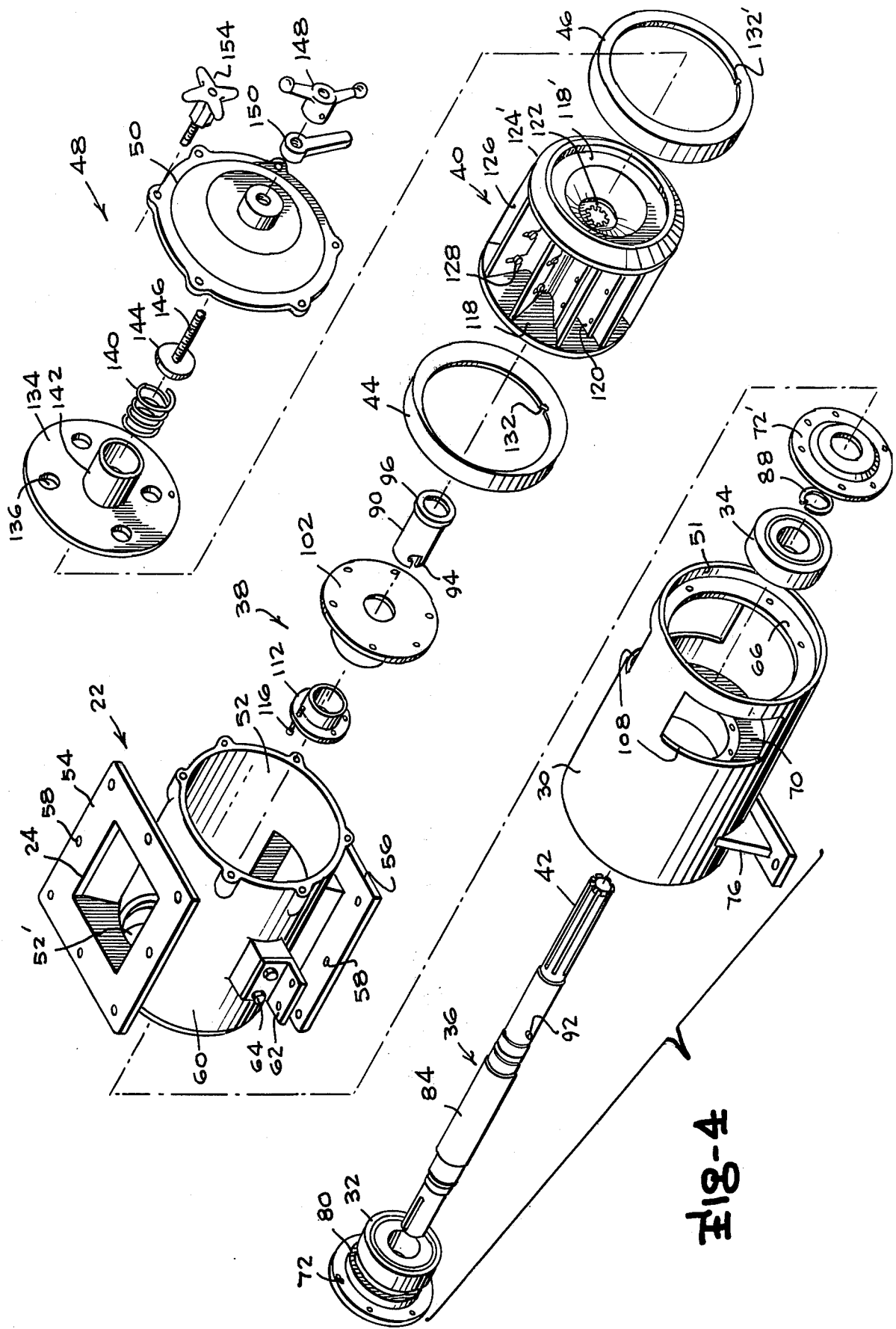

ROTARY VALVE

This invention relates to a rotary valve which permits quick and easy disassembly and access to the interior of the valve for inspection, seal maintenance and cleaning without requiring the removal of the valve from the installed position. The invention further comtemplates a novel removable shaft seal for use with the rotary valve.

Prior known rotary valves have been difficult to disassemble and clean and additionally have contained end seals for the rotor which are not independent. Without independent end seals, one end seal may wear more rapidly than the second, thereby permitting gases and particulate to escape past the rotor.

In many rotary valve applications, frequent cleaning of the internal valve parts is required; particularly, in those applications which require the handling of a foodstuff or a material which will not tolerate cross batch contamination. To achieve a thorough cleaning of all internal valve surfaces, it is necessary to completely disassemble the valves. Because of the complexity of prior known rotary valve assemblies, it has been necessary to employ to competent mechanic with numerous tools to disassemble the rotary valves for inspection, seal replacement or cleaning.

It is, therefore, the primary object of the present invention to provide a novel rotary valve.

An additional object of the present invention is to provide a rotary valve which can be disassembled for inspection, seal replacement or cleaning by an operator or an unskilled person without the use of tools or the removal of the valve from the installed position.

A further object of the invention is to provide a rotary valve which will require a minimum down time for inspection, seal replacement or cleaning.

An additional object of the present invention is to provide a shaft seal which may be utilized with a rotary valve to permit ease of removal from the shaft which it seals.

A further object of the present invention is to provide a rotary valve which is particularly adapted to use in handling of a foodstuff or a material which will not tolerate cross batch contamination.

Other objects and advantages of the invention will become more apparent to those having ordinary skill in the art to which the invention pertains from the following descriptions taken in conjunction with the accompanying drawings wherein:

FIG. 4 is an exploded perspective view of the rotary valve embodying the present invention as shown in FIG. 1.

Figure 3:
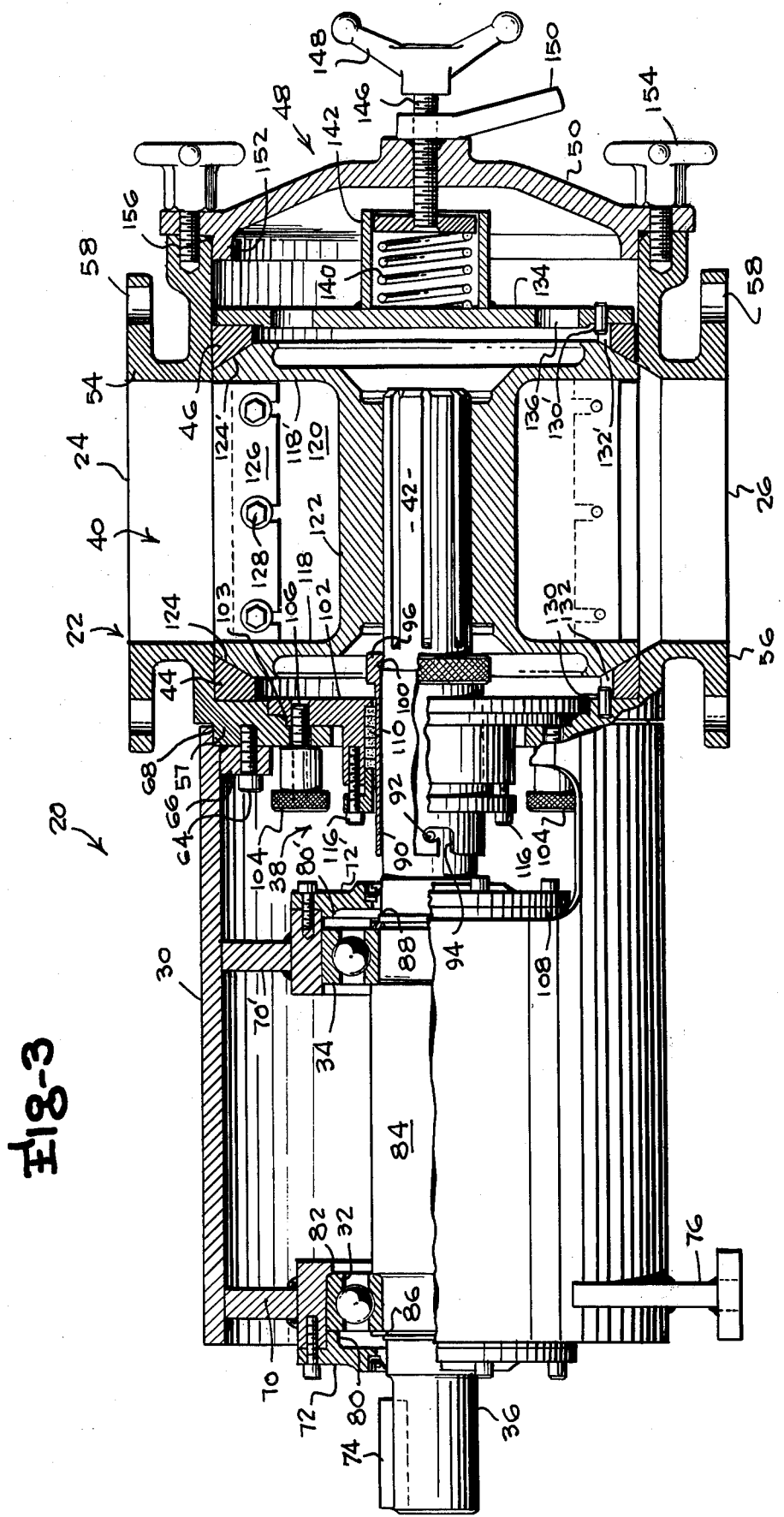
FIG. 3 is a fragmentary vertical cross-sectional view taken along lines 3—3 of FIG. 2.

Referring to the drawings, particularly FIG. 3, there is illustrated a rotary valve 20, embodying the invention, including a housing 22 having an inlet port 24, an outlet port 26 and connecting passageway 28, a housing extension 30 which provides support for the first support bearing 32 and the second support bearing 34. The bearings provide rotary support for a drive shaft 36. A shaft seal assembly 38 is fixed to the housing 22 and prevents pressurized material flowing into inlet 24 from escaping the connecting passageway 28. A rotor assembly 40 is splined to a free end 42 of the drive shaft 36 to position the rotor assembly within the passageway 28. A first rotor end seal 44 engages the rotor assembly on the side closest the support bearings 32 and 34 while a second rotor end seal 46, which is free to move axially, engages the end of the rotor assembly farthest from the supporting bearing 32 and 34. The second rotor end seal 46 is biased against the rotor assembly by a pressure assembly 48 which is supported by a cover plate 50. An open access opening 52, which is closed by cover plate 50, permits the pressure assembly 48, rotary assembly 40, rotor end seals 44 and 46 and the shaft seal assembly 38 to be removed for cleaning, inspection and seal maintenance of the valve.

The housing 22, as shown in FIG. 4, includes a square inlet flange 54 and a square outlet flange 56 having mounting holes 58 which permit the rotary valve 20 to be mounted to a conveying duct or the like. The flanges open into opposite sides of a generally cylindrical main body 60 which is open at each end to provide the access opening 52 and a shaft seal support opening 52' and to provide the inlet 24 and the outlet 26 with the intermediate connecting passageway 28. The main body 60 also provides a cylindrical surface against which the rotor assembly 40 may seal as it rotates in the connecting passageway 28. Support brackets 62 are mounted on opposite sides of the main body 60 between the inlet flange and the outlet flange to provide partial support for the valve. The brackets are attached to the main body 60 by mounting bolts 64 which the threaded into the main body.

The housing extension 30 is generally cylindrical and is attached to the housing 22 by mounting bolts 64 which extend through a mounting ring 66. The mounting ring extends inwardly from one end of the housing extension 30 with the mounting bolts 64 threading into the housing end plate 68. The housing extension 30 and housing 22 are axially aligned by shoulder 51. Two bearing support rings 70 and 70' are mounted in the housing extension 30 with one ring adjacent the free end of the housing extension and the second mounted centrally of the housing extension to provide support for the first and second support bearings 32 and 34 and for cover plate assemblies 72 and 72' which contain seals to prevent the entrance of contaminants into bearings 32 and 34. This bearing configuration permits the cantilevering of the drive shaft 36 into the connecting passageway 28 of the main body 60.

Figure 1:
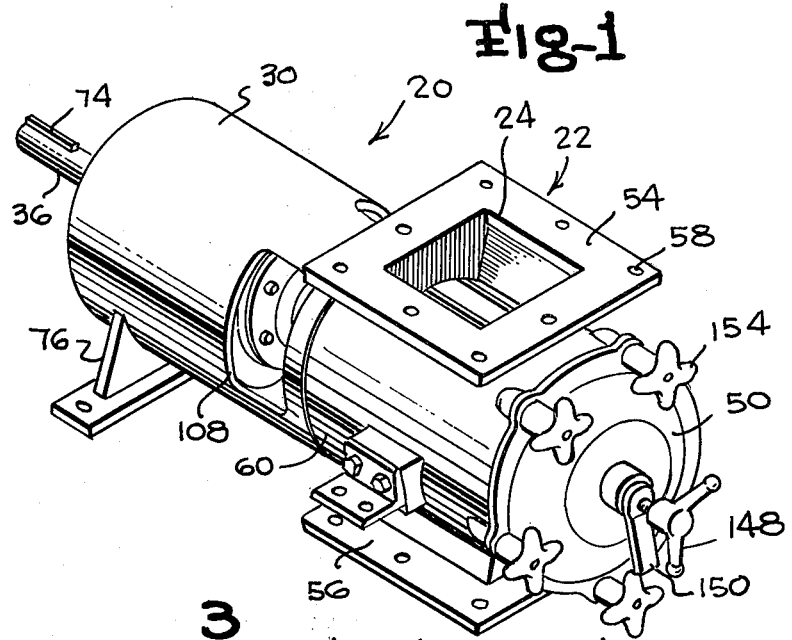
FIG. 1 is a perspective view of a rotary valve constructed in accordance with the present invention.
Figure 2:
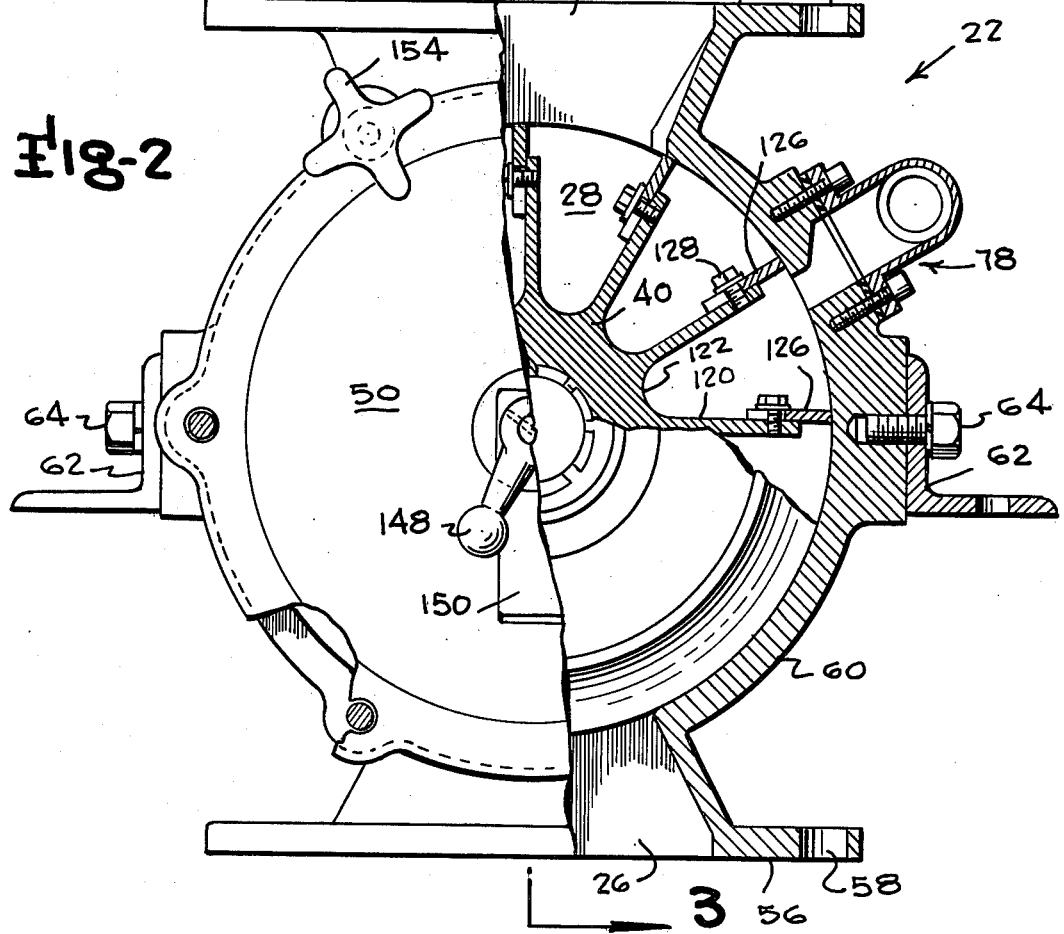
FIG. 2 is an enlarged fragmentary end view of the invention shown in FIG. 1.

The drive end of the drive shaft 36 which extends outwardly beyond the housing extension 30 has a key 74 mounted in a key way therein to permit the attachment of a drive pulley; houwever, the shaft may be driven directly from an electric motor or the like. A support foot 76 is attached to the free end of the housing extension 30 to permit additional support for the valve. An optional gas outlet assembly 78 is shown in FIG. 2 with an opening extending through the housing 22 to permit the escape of gases from the rotor assembly if desired.

The cover plate assembly 72 includes an inwardly projecting lip 80 which clamps the first bearing 32 against a retaining lip 82 extending inwardly from bearing support ring 70. The first bearing is retained on the drive shaft 36 on one side by a shoulder 84 on the drive shaft 36 which extends between the first bearing 32 and the second bearing 34 with the first bearing 32 being retained on the opposite side by a retaining ring 86 which snaps into a groove on the drive shaft 36. A second retaining ring 88 prevents movement of the second bearing 34 relative to the drive shaft 36. Cover plate assembly 72' has the inwardly projecting lip 80' machined in a manner so the second bearing 34 is free to move axially relative to the second bearing support ring 70', thereby preventing thrust loading between the two bearings.

The shaft seal assembly 38 includes a bearing sleeve 90 which provides the wear suface for the seal of the assembly. The bearing sleeve 90 is attached to the drive shaft 36 by a pin 92 which extends outwardly from the drive shaft and engages an L-shaped slot 94 in one end of the bearing sleeve. The opposite end of the bearing sleeve 90 has a knurled shoulder 96 to permit hand assembly of the bearing sleeve to the drive shaft. An inwardly directed lip extends below the knurled shoulder of the bearing sleeve. The drive shaft 36 decreases slightly in diameter at the point adjacent the inwardly directed lip on the bearing sleeve thereby permitting the insertion and retention of a resilient O-ring 100 between the bearing sleeve and the drive shaft. The O-ring is compressed slightly to maintain pressure on the bearing sleeve 90 and to keep the pin 92 locked in the L-shaped slot 94 while providing a gas-tight seal between the bearing sleeve 90 and the drive shaft 36.

A mounting flange 102 is attached to the housing end plate 68 of housing 22 by knurled thumb-nuts 104 threaded onto studs 106 which are threaded and welded into the mounting flange 102 and extend through the housing end plate 68. Sealing is provided between the mounting flange and the housing end plate by an O-ring 103. Access to the thumb-nuts 104 is provided by generally rectangular openings 108 which extend through the housing extension 30 from opposite sides adjacent the shaft seal assembly 38. Bearing sleeve seal elements 110 extend between the mounting flange 102 and the bearing sleeve 90 and are compressed against the bearing sleeve 90 to the desired degree by a compression sleeve 112 which fits around the drive shaft. The compression sleeve presses the seal elements 110 against an inwardly directed lip of the mounting flange 102. Attachment of the compression sleeve to the mounting flange 102 is accomplished by compression bolts 116 which can be tightened to achieve the desired degree of compression of the seal elements 110. The use of the bearing sleeve permits the seal assembly to be adjusted prior to installing the seal into the valve housing; therefore, the seal assembly may be removed for inspection and cleaning without changing the seal adjustment. The seal assembly may also be adjusted, after the seal is installed, through openings 108.

The rotor assembly 40 as best shown in FIG. 4 includes end plates 118,118' interconnected by vanes 120 and a hub 122 which is splined to the free end 42 of the drive shaft 36. The spline is loose fitting thereby permitting axial movement of the hub 122 with respect to the drive shaft 36 and rotation of the rotor assembly as the drive shaft is rotated. The end plates 118 and 118' include bearing surface 124 and 124' which engage the first rotor end seal 44 and the second rotor end seal 46 as best shown in FIG. 3.

Rotor tip seals 126 are attached by mounting bolts 128 to the outer edges of the vanes 120 and are adjustable to provide the desired clearance between the rotor tip seals 126 and the cylindrical interior surface of the main body 60. The rotor end seals may be made of a rigid material with a low coefficient of friction and the interior surface of the main body may be polished to reduce wear of the seal element. The rotor tip seals may be of either flexible or rigid material depending on the application.

The first rotor end seal 44 is retained in the main body 60 by housing end plate 68 on one side and the end plate bearing surface 124' on the opposite side while rotation of the first rotor end seal 44 is prevented by a retaining pin 130 which extends from housing end plate 68 into a slot 132 in the first seal 44 as shown in FIG. 3. The rotor end seals may be formed of a low friction rigid material such as Teflon.

The second rotor end seal 46 is retained against bearing surface 124' on end plate 118' by a pressure disc 134 having gas pressure relief openings 136. A retaining pin 130 on the pressure disc 134 extends into a retaining slot 132' thereby permitting rotor end seal 46 to be identical to the first rotor end seal 44. The pressure disc is forced against the second rotor end seal 46 by a compression spring 140 which is retained in a cylindrical tube 142 attached to the rear surface of the pressure disc.

The compression spring 140 is compressed by a compression plate 144 attached to the end of a pressure adjusting bolt 146 which is threaded through the center of the cover plate 50 and has a spring adjusting handle 148 mounted at its opposite end outside the valve. The desired compression of the compression spring 140 is maintained by locking the pressure adjusting bolt 146 in the desired position with a screw lock 150. With the pressure adjusting bolt 146 locked in place by screw lock 150, cover plate 50 may be removed and reassembled without altering the pressure adjustment on compression spring 140.

The cover plate 50 has a positioning lip 152 which fits into the access opening 52 to insure the centering of the pressure assembly 48 when the cover plate is mounted over the access opening. Bolts with hand knobs 154 are inserted through openings in the cover plate and are threaded into threaded bores around the access opening. An O-ring 156 extends around the access opening between the cover plate 50 and the main body 60 to prevent the escape of gas or particulate from the rotary valve.

Assembly of the rotary valve is achieved by positioning the seal elements 110 between the mounting flange 102 and the bearing sleeve 90 and tightening the compression bolts 116 to achieve the desired compression of the seal elements 110. The cover plate 50 is removed from the main body 60 and the seal assembly is installed through the access opening 52 and is held in the housing by manually tightening the knurled thumb-nuts 104 through the rectangular openings 108 in the housing extension 30. This positions the shaft end seal assembly 38 in the desired position and compresses the O-ring 103 in a sealing position between the two members. The bearing sleeve 90 is attached to the drive shaft 36 by aligning the L-shaped slot in the sleeve with the retaining pin 92 on the drive shaft. The base of the L-shaped slot forms a shallow groove to lock with the pin 92. Locking is accomplished by placing an inward pressure on the bearing sleeve and turning the sleeve with the knurled shoulder 96, which is accessible through the access opening 52 without the rotor assembly in position, to place the pin in the shallow locking groove. In locking the sleeve to the pin, the O-ring 100, between the shaft and the sleeve, is compressed slightly to maintain a pressure on the sleeve which keeps the pin in a locked position and provides a gas tight seal between the sleeve 90 and the drive shaft 36.

The first rotor end seal 44 is then positioned within the main body 60 and the rotor assembly 50 is aligned with the splines on the free end 42 of the drive shaft. The assembly is then slid onto the drive shaft against the first rotor end seal 44. The second rotor end seal 46 is then positioned against the bearing surface 124' and the pressure plate assembly 48 is then mounted by placing the cover plate 50 in the access opening 52. The hand knobs 154 are tightened to lock the O-ring 156 between the cover plate 50 and the main body 60. Screw lock 150 is released and handle 148 is turned to compress the compression spring 140 to the desired pressure. The screw lock 150 is then tightened against the cover plate 50 to lock the handle 148 in the desired position.

Disassembly of the valve is accomplished by loosening the cover plate hand knobs 154 and removing the cover plate 50. The pressure disc 134 and compression spring 140 are dimensioned to provide clearance for each removal. The rotor end seals 44 and 46 are a slip fit in the main body 60 and the valve rotor assembly slides freely from the splines on the drive shaft 36. The shaft seal assembly is easily removed by loosening knurled thumb-nuts 104 holding the shaft seal assembly 38 in position. The knurled shoulder 96 of the bearing sleeve 90 is turned while applying an inward pressure against the O-ring 100 to remove the bearing sleeve from the locking pin 92. These features provide quick and easy access to the interior of the rotary valve for inspection, maintanance, cleaning, or replacement of seals without disturbing the seal adjustment.

As can be seen from the above, all of the seals and wearing surfaces in a rotary valve incorporating the present invention may be easily removed without the use of any tools and may be quickly inspected, cleaned, replaced if necessary and reinstalled with a minimum amount of down time for the system.

From the foregoing detailed description, it will be evident that there are a number of changes, adaptions and modifications of the present invention which come within the province of those skilled in the art. However, it is intended that all such variations not departing from the spirit of the invention be considered as within the scope thereof and as limited solely by the appended claims.

I claim:

1. A valve comprising a housing including an inlet, an outlet and an access open end, a detachable closure means mounted on said housing for closing said open end, a drive shaft journalled in said housing having a free end disposed between said inlet and outlet, adjacent said closure means, a rotor mounted on the free end of said shaft and having an annular surface engageable with said housing, said rotor being axially removable from the free end of said drive shaft, said annular surface having at least one recess communicable with said inlet and outlet by rotating the drive shaft for conveying material from said inlet to said outlet, a first axial seal disposed between said housing and said rotor, and a second axial seal disposed between said rotor and said closure means, in substantial longitudinal alignment with said first axial seal thereby providing a valve which is easily disassembled without removing the drive shaft to facilitate replacement of seals and cleaning.

2. The valve of claim 1 additionally including retaining means between the rotor and the drive shaft for limiting relative movement between the rotor and the shaft to axial movement of the assembly on the shaft, and wherein the second axial seal is free to move axially and the detachable closure means includes a pressure means for pressing the second axial seal means against the rotor thereby pressing the rotor against the first axial seal.

3. The valve of claim 2 wherein the restraining means comprises matching splines between the rotor and the shaft thereby permitting the rotor to slide axially on the drive shaft while preventing any relative rotational movement between the rotor and the shaft.

4. The rotary valve of claim 2 wherein the rotor includes a plurality of vanes extending between two end plates and the first axial seal comprises a first conical sealing surface on the end plate closest the journalling in the housing and a seal element mounted between the housing and the rotor and having a matching conical sealing surface to engage the first conical sealing surface when the rotor is positioned on the drive shaft.

5. The valve of claim 4 wherein the second axial seal comprises a second conical sealing surface on the end plate farthest from the journalling in the housing and a second seal element positioned in the housing for axial movement along the shaft and having a matching conical sealing surface to engage the second conical sealing surface when the rotor is positioned on the drive shaft.

6. The valve of claim 5 wherein the pressure means includes a pressure disc which engages the second seal element and includes a spring compressed between the housing and the pressure disc to press the second seal element against the rotor which in turn presses against the first seal element.

7. The valve of claim 6 wherein the closure means includes a cover plate positionable over said access opening, a seal between the cover plate and the housing to seal the access opening from the exterior of the valve, and hand operable means for attaching the cover plate to the housing and wherein the pressure means additionally includes a hand operable threaded member extending through the cover plate which engages one end of said spring to cause the spring to be compressed to the desired degree against the pressure plate.

8. A valve comprising a housing including an inlet, an outlet and an access open end, a detachable closure means mounted on said housing for closing said open end, a drive shaft journalled in said housing having a free end disposed between said inlet and outlet, adjacent said closure means, a rotor mounted on the free end of said shaft having an annular surface engageable with said housing, said annular surface having at least one recess communicable with said inlet and said outlet by rotating the drive shaft for conveying material therebetween, and a detachable sealing assembly mounted on said housing in sealing engagement with said shaft, between the journalled portion of said shaft and said rotor, said sealing assembly comprising a sleeve removably mounted on said shaft, and a mounting member detachably secured to said housing and having a bore for receiving said shaft mounted sleeve therethrough, said mounting member bore having an enlarged section, packing disposed in said enlarged bore section between said mounting member and said shaft mounted sleeve.

9. The valve of claim 8 additionally including means for compressing said packing, causing it to expand radially and provide a seal between said mounting member and said shaft mounted sleeve.

10. The valve of claim 8 additionally including a static seal means between the sleeve and the shaft.

11. The valve of claim 10 wherein the static seal means includes a shoulder on the shaft and an inwardly directed lip on the bore of the sleeve with said lip positionable adjacent said shoulder and an O-ring seal positioned between the lip and the shoulder.

12. The valve of claim 10 including an attaching means for removably mounting the sleeve on the shaft, said attaching means includes an outwardly projecting pin on the shaft and an L-shaped slot on the bore of the sleeve with the slot opening onto an end of the sleeve whereby the slot may be axially slid over the pin and rotated into the end of the slot to fix the sleeve to the shaft.

13. The valve of claim 11 wherein the attaching means includes an outwardly projecting lip on the shaft and an L-shaped slot on the bore of the sleeve with the slot opening onto an end of the sleeve whereby the slot may be axially slid over the pin and rotated at the end of the slot to fix the sleeve to the shaft.

14. A valve comprising a housing including an inlet, an outlet and an access open end, a detachable closure means mounted on said housing for closing said open end, a drive shaft journalled in said housing having a free end disposed between said inlet and outlet, adjacent said closure means, a rotor mounted on the free end of said shaft having an annular surface engageable with said housing, said annular surface having at least one recess communicable with said inlet and said outlet by rotating the drive shaft for conveying material therebetween, a detachable sealing assembly mounted on said housing in sealing engagement with said shaft, between the journalled portion of said shaft and said rotor, said sealing assembly comprising a sleeve removable mounted on said shaft, a mounting member detachably secured to said housing and having a bore for receiving said shaft mounted sleeve therethrough, said mounting member bore having an enlarged section, packing disposed in said enlarged bore section between said mounting member and said shaft mounted sleeve, and means for compressing said packing, causing it to expand radially and provide a seal between said mounting member and said shaft mounted sleeve, a first axial seal disposed between said housing and said rotor, and a second axial seal disposed between said rotor and said closure means, in substantial longitudinal alignment with said first axial seal.

15. The valve of claim 14 additionally including retaining means between the rotor and the drive shaft for limiting relative movement between the rotor and the shaft to axial movement of the assembly on the shaft, and wherein the second axial seal is free to move axially and the detachable closure means includes a pressure means for pressing the second axial seal against the rotor thereby pressing the rotor against the first axial seal.

16. The valve of claim 15 wherein the restraining means comprises matching splines between the rotor and the shaft thereby permitting the rotor to slide axially on the drive shaft while preventing any relative rotational movement between the assembly and the shaft.

17. The rotary valve of claim 15 wherein the rotor includes a plurality of vanes extending between two end plates and the first axial seal comprises a first conical sealing surface on the end plate closest the journalling in the housing and a seal element mounted in the housing and having a matching conical sealing surface to engage the first conical sealing surface when the rotor is positioned on the drive shaft.

18. The valve of claim 15 wherein the second axial seal comprises a second conical sealing surface on the end plate farthest from the journalling in the housing and a second seal element positioned in the housing for axial movement along the shaft and having a matching conical sealing surface to engage the second conical sealing surface when the rotor is positioned on the drive shaft.

19. The valve of claim 18 wherein the pressure means includes a pressure disc which engages the second seal element and includes a spring compressed between the housing and the pressure disc to bias the second seal element against the rotor which in turn presses against the first seal element.

20. The valve of claim 14 additionally including a static seal means between the sleeve and the shaft.

21. The valve of claim 20 wherein the static seal means includes a shoulder on the shaft and an inwardly directed lip on the bore of the sleeve with said lip positionable adjacent said shoulder and an O-ring seal positioned between the lip and the shoulder.

22. The valve of claim 21 including an attaching means for removably mounting the sleeve on the shaft, said attaching means includes an outwardly projecting pin on the shaft and an L-shaped slot on the bore of the sleeve with the slot opening onto an end of the sleeve whereby the slot may be axially slid over the pin and rotated into the end of the slot to fix the sleeve to the shaft.

23. The valve of claim 22 wherein the attaching means includes an outwardly projecting lip on the shaft and an L-shaped slot on the bore of the sleeve with the slot opening onto an end of the sleeve whereby the slot may be axially slid over the pin and rotated at the end of the slot to fix the sleeve to the shaft.

* * * * *